United States Patent Office 2,829,112
Patented Apr. 1, 1958

2,829,112

ANTI-FOAM EMULSIONS

Myer M. Solomon, Albany, N. Y., assignor to General Electric Company, a corporation of New York No Drawing. Application September 22, 1955
Serial No. 536,051

2 Claims. (Cl. 252—358)

This invention is concerned with emulsions capable of reducing or preventing foaming in aqueous systems. More particularly, the invention is concerned with a silicone anti-foam emulsion consisting essentially, by weight, of (1) 20 to 40 parts of a methylpolysiloxane of from 20 to 125 centipoise viscosity and containing an average of from about 1.95 to 2.25 methyl groups per silicon atom, (2) from 0.5% to 5% of a finely divided silica, (3) from 4 to 8 parts of a monoester of polyethylene glycol and stearic acid having the formula

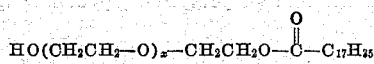

where $x$ is a whole number greater than 1, (4) from 6 to 10 parts of a monostearate ester of sorbitol having the formula

and (5) from 40 to 65 parts water.

One of the objects of this invention is to prepare a silicone anti-foam emulsion which is stable, i. e., will maintain its homogeneously dispersed form at normal storage temperatures for long periods of time.

Another object of the invention is to prepare a silicone anti-foam emulsion which will not adversely affect preservatives incorporated in cosmetics and drugs during the manufacture of the latter.

A still further object of the invention is to obtain an anti-foam silicone emulsion which does not require dilution prior to use for anti-foam purposes but can be introduced and dispersed readily in aqueous systems subject to foaming without further treatment of the anti-foam mixture.

Other objects of the invention will become apparent from the description thereof which follows:

The use of organopolysiloxane fluids for anti-foam purposes to prevent foaming in aqueous systems is disclosed in U. S. Patent 2,416,504—Trautman. It has been found that emulsions of these organopolysiloxanes are especially suitable as anti-foam agents when used in connection with aqueous products. An example of such an anti-foam emulsion is described in U. S. Patent 2,595,928—Currie et al., which shows an anti-foam emulsion composed of a methylpolysiloxane of at least 200 cps. viscosity, finely divided silica, water, glyceryl monostearate, and as an emulsifying agent, a member selected from the class consisting of polyoxyethylene stearate and propylene glycol monolaurate.

Attempts to use the anti-foam emulsion described in the above-identified Currie et al. patent have met with certain disadvantages. Thus, it has been found that the glyceryl monostearate, which according to the patentees is necessary if one is to obtain the anti-foaming action, inhibits preservatives used in cosmetics and drugs. Thus, if the Currie et al. emulsion is used to prevent foaming in systems in which cosmetics and drugs containing preservatives are prepared, it will be found that the preservative will be inhibited by the presence of the glyceryl monostearate in the final product. In addition, the antifoam emulsions of the Currie et al. patent require methylpolysiloxane fluids of viscosities of at least 200 centipoises at 25° C., and in general require methylpolysiloxane fluids which have scarcely any flow and therefore are of viscosities considerably above the minimum 200 centipoise viscosity called for in the patent. Finally, the antifoam emulsion of this patent requires dilution with water prior to use in aqueous systems. It has been found that adequate dilution and satisfactory incorporation in the aqueous system requires undesirably long periods of time in order to effect homogeneous dispersion in the diluting water as well as in the aqueous system.

I have now discovered that I am able to make an antifoam emulsion capable of preventing foaming of aqueous systems by forming an emulsion composed of a specific mixture of ingredients from which the glyceryl monostearate is omitted and yet I am able to obtain a product which gives equivalent anti-foaming characteristics to those described in the Currie et al. patent, requiring less of the methylpolysiloxane than is used in the patent. In addition, my antifoam emulsion can be easily introduced and dispersed in the aqueous system without prior dilution and this dispersion requires a relatively short period of time, usually only by mere mixing of the ingredients. Because of the absence of the glyceryl monostearate, the inhibitory effect on preservatives in drugs and cosmetics is obviated. Moreover, I am able to use less expensive, lower viscosity methylpolysiloxanes than is possible by the use of the compositions described in the Currie et al. patent.

All of the foregoing difficulties of the prior art antifoam emulsions can be obviated and the previously described objectives attained by preparing an anti-foam emulsion from a mixture of ingredients consisting essentially of water, finely divided silica, a methylpolysiloxane fluid of between 20 to 125 centipoise viscosity when measured at 25° C., and the critical combination of two specific emulsifying agents described above, namely, the monostearic acid ester of polyethylene glycol (polyoxyethylene monostearate) and the monostearic acid ester of sorbitol.

One of the important and critical features of the present invention is the necessity of having both of the above stearate esters present in the emulsion. If one uses only one of these stearates in attempting to prepare the emulsion, little or no emulsion will be formed; if any emulsion is formed, it will have very poor stability settling out in a relatively short period of time. In addition, when using only one of the two stearate emulsifying agents, inadequate anti-foaming action will be obtained.

The organopolysiloxanes employed in the practice of the present invention are liquid, benzene-soluble methylpolysiloxanes of between 20 to 125 centipoises viscosity and preferably contain from about 1.95 to 2.25 methyl groups per silicon atom. Methylpolysiloxane of this type and methods for preparing the same are more particularly disclosed in Patnode U. S. Patent 2,469,890.

The organopolysiloxane anti-foam composition must contain from 0.5 to 5% of a finely divided silica which may be, for instance, silica aerogel, a fume silica (prepared, for instance, by burning volatile silica compounds such as silicon tetrachloride, trichlorosilane, ethyl orthosilicate, and methyl orthosilicate), precipitated silicas, etc. Such finely divided silicas are well known in the art and are particularly described in, for instance, U. S. Patent 2,541,137.

The particular emulsifying agents employed herein are readily available on the open market. The monostearate acid ester of sorbitol is sold as Span 60 while the polyoxyethylene stearate (which can be obtained by effecting an adduct addition of 20 mols of ethylene oxide with one mol of stearic acid) is obtainable on the open market under the trade name Myrj 52. These emulsifying agents when employed in the above concentrations produce emulsions which are stable at normal temperatures for long periods of time. They may be readily diluted with water when ready for use, if desired; weight concentrations of 2 to 10% methylpolysiloxane in the total weight of water present are readily obtained.

One method for preparing the emulsions is to wet the silica filler with the methylpolysiloxane and then adding the emulsifying agents to the filler-siloxane mixture on a colloid mill or in a mixing tank, then stirring in the water until a homogeneous mixture is formed, and then passing the entire mixture of ingredients through a colloid mill or homogenizer until a finely dispersed, stable emulsion is obtained.

The compositions of this invention are of value when used for the purpose of defoaming aqueous system employed for anti-freeze purposes and particularly in the manufacture of food products, in pharmaceuticals and in cosmetics. The anti-foam emulsion herein described has eminent use for deforming other aqueous systems such as defoaming latex used to make various articles by dipping. The presence of the anti-foam emulsion prevents the formation of small pinholes in the dipped elastic product.

In order that those skilled in the art may better understand how the present invention may be practiced, the following example is given by way of illustration and not by way of limitation. All parts are by weight.

*Example 1*

A methylpolysiloxane having the formula

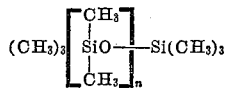

where $n$ is an integer greater than 1 (e. g., from 3 to 25 or more) of about 100 cps. measured at 25° C. was mixed with a finely divided silica, specifically silica aerogel (Santocel C) in such a manner that the silica was wet by the methylpolysiloxane. Thereafter, the two above-mentioned emulsifying agents, specifically the monostearic acid ester of polyethylene glycol and the monostearic acid ester of sorbitol, were intimately dispersed in the wetted filler. This latter mixture of ingredients was then mixed with water thoroughly until a homogeneous mixture was obtained and the entire mixture passed through a colloid mill until a finely dispersed, stable emulsion was obtained. The proportion of ingredients employed was as follows:

| | Parts |
|---|---|
| Water | 54.2 |
| Methylpolysiloxane | 30 |
| Monostearic acid ester of polyethylene glycol | 6 |
| Monostearic acid ester of sorbitol | 8.3 |
| Silica aerogel | 1.5 |

The above-identified emulsion which contained 30%, by weight, methylpolysiloxane was then tested for anti-foaming ability as follows: 100 cc. of a neoprene latex water emulsion was placed in a 500 ml. flask. The latex was heated to 60–65° C. while applying a vacuum to the opening of the flask. The anti-foam emulsion was added to the foamed latex in such an amount that there was employed in one instance 0.01 cc. and in another instance 0.001 cc. of the anti-foam emulsion. In both instances, the foam on the latex was completely knocked down and disappeared upon introduction and dispersion of the anti-foam emulsion. The amounts of the emulsion required to cause defoaming of the foam latex employing the anti-foam emulsion of the present invention were from 1/10 to 1/100 that required to anti-foam 100 cc. of the same latex employing the anti-foam emulsion described in the Currie et al. patent.

What I claim as new and desire to secure by Letters Patent of the United States is:

1. An anti-foam emulsion consisting essentially, by weight, of (1) from 20 to 40 parts of a methylpolysiloxane of from 20 to 125 centipoises viscosity at 25° C. and having a ratio of from about 1.95 to 2.25 methyl groups per silicon atom, (2) from 0.5 to 5 parts of a finely divided silica selected from the class consisting of silica aerogel, fume silicas, and precipitated silicas, (3) from 40 to 65 parts water, (4) from 4 to 8 parts of the monostearic acid ester of polyethylene glycol having the formula

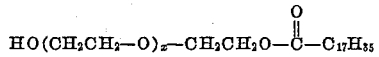

where $x$ is a whole number greater than 1, and (5) from 6 to 10 parts of the monostearic acid ester of sorbitol.

2. A dilute anti-foam emulsion composed essentially of water diluted with a mixture of ingredients consisting essentially, by weight, of (1) from 20 to 40 parts of a methylpolysiloxane of from 20 to 125 centipoises viscosity at 25° C. and having a ratio of from about 1.95 to 2.25 methyl groups per silicon atom, (2) from 0.5 to 5 parts of a finely divided silica selected from the class consisting of silica aerogel, fume silicas, and precipitated silicas, (3) from 40 to 65 parts water, (4) from 4 to 8 parts of the monostearic acid ester of polyethylene glycol having the formula

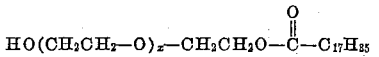

where $x$ is a whole number greater than 1, and (5) from 6 to 10 parts of the monostearic acid ester of sorbitol.

References Cited in the file of this patent

UNITED STATES PATENTS

| 2,595,928 | Currie et al. | May 6, 1952 |
| 2,632,736 | Currie | Mar. 24, 1953 |